United States Patent
Suzuki

(10) Patent No.: US 9,334,779 B2
(45) Date of Patent: May 10, 2016

(54) EXHAUST GAS PURIFICATION DEVICE FOR INTERNAL COMBUSTION ENGINE

(75) Inventor: Takashi Suzuki, Goetnba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/371,515

(22) PCT Filed: Jan. 11, 2012

(86) PCT No.: PCT/JP2012/050323
§ 371 (c)(1),
(2), (4) Date: Jul. 10, 2014

(87) PCT Pub. No.: WO2013/105221
PCT Pub. Date: Jul. 18, 2013

(65) Prior Publication Data
US 2014/0325968 A1    Nov. 6, 2014

(51) Int. Cl.
*F01N 3/18* (2006.01)
*F01N 3/20* (2006.01)
*F01N 9/00* (2006.01)

(52) U.S. Cl.
CPC .............. *F01N 3/208* (2013.01); *F01N 3/2013* (2013.01); *F01N 3/2066* (2013.01); *F01N 9/00* (2013.01); *F01N 2240/16* (2013.01); *F01N 2590/11* (2013.01); *F01N 2610/02* (2013.01); *F01N 2610/105* (2013.01); *F01N 2900/1602* (2013.01); *F01N 2900/1811* (2013.01); *F01N 2900/1812* (2013.01); *F01N 2900/1814* (2013.01); *Y02T 10/24* (2013.01); *Y02T 10/26* (2013.01); *Y02T 10/47* (2013.01)

(58) Field of Classification Search
CPC .......... F01N 2900/104; F01N 2240/16; F01N 2240/1602; F01N 2900/1814; F01N 2900/1818; B60W 10/26; B60W 2510/244
See application file for complete search history.

(56) References Cited

U.S. PATENT DOCUMENTS

| | | |
|---|---|---|
| 2007/0113544 A1 | 5/2007 | Nishina et al. |
| 2010/0229532 A1 | 9/2010 | Ohno |
| 2010/0290957 A1 | 11/2010 | Yoshida et al. |
| 2011/0078999 A1* | 4/2011 | Gonze ................... F01N 3/2026 60/286 |

(Continued)

FOREIGN PATENT DOCUMENTS

| | | |
|---|---|---|
| JP | 2005-113708 | 4/2005 |
| JP | 2009-97348 | 5/2009 |
| JP | 2010-265862 | 11/2010 |

(Continued)

*Primary Examiner* — Jonathan Matthias
(74) *Attorney, Agent, or Firm* — Finnegan, Henderson, Farabow, Garrett & Dunner, LLP

(57) ABSTRACT

An exhaust gas purification device has: a catalyst to purify exhaust gas by reduction of nitrogen oxide included in the exhaust gas discharged from a combustion chamber of the engine, which catalyst has a purification efficiency of the nitrogen oxide varying depending on a temperature of the catalyst; a supply means capable of supplying a reduction agent for the reduction of the nitrogen oxide to the exhaust gas guided to the catalyst; and a control means having a configuration capable of controlling the temperature of the catalyst depending on an operating condition of the engine. The device has a configuration to prohibit controlling the temperature of the catalyst when a condition of being incapable of supplying the reduction agent in an amount corresponding to the temperature of the catalyst is satisfied, even if the temperature of the catalyst needs to be controlled.

2 Claims, 6 Drawing Sheets

(56) References Cited

U.S. PATENT DOCUMENTS

2012/0090294 A1* 4/2012 Sujan .................... B60W 10/26 60/274
2012/0173062 A1* 7/2012 Madurai Kumar et al. ..... 701/22

FOREIGN PATENT DOCUMENTS

| JP | 2011-102568 | 5/2011 | |
| JP | WO 2011145572 A1 * | 11/2011 | .............. F01N 3/208 |

* cited by examiner

EXHAUST GAS PURIFICATION DEVICE FOR INTERNAL COMBUSTION ENGINE

CROSS-REFERENCE TO RELATED APPLICATIONS

This application is a national phase application of International Application No. PCT/JP2012/050323, filed Jan. 11, 2012, the content of which is incorporated herein by reference.

TECHNICAL FIELD

This invention relates to an exhaust gas purification device for internal combustion engine, which device has a catalyst to purify exhaust gas of the internal combustion engine.

BACKGROUND ART

Various materials such as nitrogen oxide (NOx) and particle matters (PM) are generally contained in gas (exhaust gas) discharged from combustion chambers of internal combustion engines. An amount of emission of these materials to the outside of the engine is desirably reduced as much as possible. Thus, exhaust gas purification devices to purify exhaust gas by removing these materials from the exhaust gas are conventionally designed.

For example, an exhaust gas purification device having a specific catalyst is conventionally designed, which catalyst is installed on an exhaust passage and purifies exhaust gas by selectively reducing specific components included in the exhaust gas (so-called selective catalytic reduction catalyst, hereinafter referred to as "SCR catalyst"). This kind of exhaust gas purification devices include, for example, a device having a SCR catalyst to selectively remove (reduce) nitrogen oxide (NOx) included in the exhaust gas and supplying a reduction agent (e.g., urea solution) to the exhaust gas to be guided to the catalyst. This exhaust gas purification device removes nitrogen oxide from the exhaust gas (i.e., reduces nitrogen oxide to nitrogen and water) by reacting nitrogen oxide included in the exhaust gas and the reduction agent (e.g., ammonia generated through hydrolysis of urea of the urea solution) in the SCR catalyst.

One of exhaust gas purification devices having the SCR catalyst (hereinafter referred to as "conventional device") controls the composition of the nitrogen oxides (molar ratio between nitrogen monoxide and nitrogen dioxide) included in exhaust gas to be guided to the SCR catalyst in order to remove the nitrogen oxide from the exhaust gas as effective as possible.

In particular, the conventional device has an electric heater, an oxidative catalyst to invert nitrogen monoxide to nitrogen dioxide (the inversion rate between nitrogen monoxide to nitrogen dioxide depends on the temperature of the oxidative catalyst), a diesel particulate filter (hereinafter referred to as "DPF") to collect particle matters, a nozzle to supply urea solution as the reduction agent in exhaust gas, and an SCR catalyst, in this order on the exhaust passage. The conventional device controls the temperature of the oxidative catalyst by changing an amount of heat generation of the electric heater (i.e., temperature of exhaust gas to be guided to the oxidative catalyst) depending on operating condition of the engine. Thereby, the conventional device controls the composition of nitrogen oxides included in exhaust gas to be guided to the SCR catalyst after passing the oxidative catalyst to a specific composition at which nitrogen oxides are effectively removed (reduced) with the SCR catalyst. For example, see the patent literature 1.

CITATION LIST

Patent Literature 1: JP 2010-265862 A

SUMMARY OF INVENTION

As above, the conventional device controls the composition of nitrogen oxides in exhaust gas in consideration of the purification efficiency of the exhaust gas with the SCR catalyst. On the other hand, the purification efficiency generally changes depending on not only the composition of nitrogen oxides but also "an amount of reduction agent" supplied to the exhaust gas to be guided to the catalyst.

Regarding the amount of reduction agent, the conventional device is configured to deliver the reduction agent from a reduction agent delivery system (e.g., a reduction agent storage tank to store the reduction agent, and a delivery pipe to transport the reduction agent from the reduction agent storage tank to the nozzle, which are not shown in figures) to the nozzle, and supply (inject) the reduction agent from the nozzle in the exhaust gas. Hence, an amount of the reduction agent to be supplied to exhaust gas may not be necessarily equal to the an amount of reduction agent required at the SCR catalyst due to several reasons such as a factor resulting from the reduction agent delivery system (e.g., a significant decline of the (remaining) amount of reduction agent stored in the reduction agent delivery system, and an occurrence of a failure by which the reduction agent does not smoothly pass through the delivery pipe), a factor resulting from the nozzle (e.g., an occurrence of a failure by which the reduction agent is not properly injected with the nozzle) and a factor resulting from the reduction agent itself (e.g., a significant decline of flowability of the reduction agent).

In the above case, the SCR catalyst may not purify exhaust gas effectively even if the composition of nitrogen oxides included in the exhaust gas is controlled by using the oxidative catalyst and the electric heater. In other words, in spite of energy consumed in the exhaust gas purification device (e.g., power consumption of the electric heater), the exhaust gas may not be purified at a purification efficiency consistent with the amount of the consumed energy. However, in view of enhancing fuel efficiency of the engine, the purification efficiency of exhaust gas on the exhaust gas purification device preferably corresponds to the amount of the consumed energy on the exhaust gas purification device as far as possible.

In view of the above technical problems, an object of the present invention is to provide an exhaust gas purification device by which the amount of the consumed energy on the device corresponds to the purification efficiency of exhaust gas on the device as far as possible.

The exhaust gas purification device for an internal combustion engine of the present invention, for solving the above technical problem, comprises:

a "catalyst" to purify exhaust gas by reduction of nitrogen oxide included in the exhaust gas discharged from a combustion chamber of the engine, which has a purification efficiency of the nitrogen oxide varying depending on a temperature of the catalyst;

a "supply means" capable of supplying a reduction agent (i.e., means for supplying reduction agent) for the reduction of the nitrogen oxide to the exhaust gas guided to the catalyst; and a "control means" having a configuration capable of controlling the temperature of the catalyst (i.e., means for controlling temperature of the catalyst) depending on an operating condition of the engine.

The "catalyst" may be any means capable of purifying nitrogen oxide included in exhaust gas guided to the catalyst by using the reduction agent, and is not specifically limited. For example, as the catalyst, a SCR catalyst (Selective Catalytic Reduction catalyst) that has a configuration in which catalytic components (e.g., zeolitic catalysts and vanadium catalysts) are supported in a carrier (e.g., ceramics) may be employed. In addition, the term "to purify exhaust gas" represents to remove at least part of nitrogen oxides included in exhaust gas from the exhaust gas and does not necessarily represent to remove all of nitrogen oxides included in the exhaust gas from the exhaust gas.

The "supply means (means for supplying reduction agent)" may be any means capable of supplying the reduction agent in the exhaust gas discharged from the combustion chamber of the engine before the exhaust gas goes into the catalyst, and is not specifically limited in the composition thereof. For example, as the supply means, a reduction agent supply system configured with an injector to inject the reduction agent in an exhaust pipe, a delivery pipe to deliver the reduction agent to the injector and a reduction agent storage tank to which the delivery pipe is connected may be employed. Furthermore, the supply means may be installed at any position where the supply means can supply the reduction agent to the exhaust gas guided to the catalyst, and is not specifically limited in installation position. For example, the supply means may be installed at a position upstream of the catalyst on the exhaust passage of the engine.

In addition, the "upstream" represents a direction corresponding to the backward direction of the movement of the exhaust gas in the exhaust passage. For example, the term "a position upstream of the catalyst" represents a position closer to the combustion chamber compared with a position at which the catalyst is installed. To the contrary, the "downstream" represents a direction corresponding to the forward direction of the movement of the exhaust gas in the exhaust passage. For example, the term "a position downstream of the exhaust gas purification device" represents a position apart from the combustion chamber of the engine compared with a position at which the exhaust gas purification device is installed.

The "reduction agent" may be any agent including a substance capable of reducing the nitrogen oxide included in the exhaust gas (or, any agent from which a substance capable of reducing the nitrogen oxide is generated), and is not specifically limited. For example, as the reduction agent, urea solution and ammonia may be employed.

The "operating condition of the engine" may be any operating condition related to the temperature of the catalyst (or, any index representing the operating condition), and is not specifically limited. For example, as the operating condition of the engine, the temperature itself of the catalyst, and parameters relating to a temperature (combustion temperature) of exhaust gas (e.g., a fuel injection time of the diesel engine, a spark ignition time of the spark-ignition engine, a EGR ratio of an engine in which the exhaust gas recirculation (EGR) to recirculate exhaust gas from the exhaust passage to the intake passage is done, and a supercharging pressure of engines in which intake air is compressed) may be employed.

The "control means (means for controlling temperature of the catalyst)" may be any means having a configuration capable of controlling the temperature of the catalyst directly or indirectly, and is not specifically limited. For example, as the control means, a means having a configuration to control the temperature of the catalyst by heating the catalyst itself (e.g., an electric heater set to surround the catalyst) and a means having a configuration to control the temperature of the catalyst by heating exhaust gas guided to the catalyst (e.g., an electric heater installed upstream of the catalyst on the exhaust passage) may be employed. In addition, the term "controlling" the temperature of the catalyst includes increasing the temperature of the catalyst, decreasing the temperature of the catalyst, and keeping the temperature of the catalyst at a specific temperature.

In the above configuration, the exhaust gas is purified through the reaction, occurred in the catalyst, between the reduction agent supplied to the exhaust gas from the supply means and nitrogen oxides in the exhaust gas. Hence, an appropriate amount of reduction agent (that is, an amount corresponding to "the temperature of the catalyst", which temperature is controlled depending on the operating condition of the engine) is preferably supplied to the exhaust gas from the supply means in order to purify the exhaust gas efficiently. To the contrary, in the case that the appropriate amount of reduction agent is not supplied due to various factors, the nitrogen oxide in the exhaust gas may not be purified sufficiently even when the temperature of the catalyst is controlled. In other words, the energy used to control the temperature of the catalyst may not contribute to enhance the purification efficiency on nitrogen oxide. However, any energy consumption that does not contribute to achieve the intended purpose (i.e., enhancement of the purification efficiency on nitrogen oxide) is undesirable in view of enhancing the fuel efficiency of the engine.

In view of the above, the exhaust gas purification device of the present invention having:

a configuration to prohibit controlling the temperature of the catalyst when "a condition of being incapable of supplying the reduction agent in an amount corresponding to the temperature of the catalyst" is satisfied, even if the temperature of the catalyst needs to be controlled.

The above configuration allows the device not to control the temperature of the catalyst when a sufficient amount of reduction agent would not be supplied, even in the case that the temperature of the catalyst should be controlled (e.g., the case where the temperature of the catalyst is lower than a predetermined temperature). Thereby, the exhaust gas purification device of the present invention is able to match the amount of energy used in the exhaust gas purification device with the purification efficiency of exhaust gas in the exhaust gas purification device as far as possible. As a result, the fuel efficiency of the engine is enhanced. Furthermore, the device can suppresses a deterioration of the catalyst as far as possible because of avoiding the control of the temperature of the catalyst (e.g., heating) under the condition that the sufficient amount of reduction agent is not supplied.

On the other hand, the case "when the temperature of the catalyst needs to be controlled" may be defined based on a required purification efficiency of the catalyst on nitrogen oxide, etc., and is not specifically limited. For example, as the case when the temperature of the catalyst needs to be controlled, the case where the temperature of the catalyst is lower than a predetermined temperature may be employed.

The "condition of being incapable of supplying the reduction agent in an amount corresponding to the temperature of the catalyst" may be any condition in consideration of statuses of the supply means, and is not specifically limited. For example, as the condition of being incapable of supplying the reduction agent in an amount corresponding to the temperature of the catalyst, the following cases may be employed: a case where a remaining amount of reduction agent in the supply means is smaller than a predetermined amount; a case where the flowability of the reduction agent is smaller than a predetermined degree (e.g., a case where the reduction agent is frozen or a case where specific components are deposited in the reduction agent); and a case where members constituting the supply means fails to provide original performance (e.g., a case where any deterioration or breakdown occurs).

Next, several embodiments of the exhaust gas purification device of the present invention (the embodiments A to C) are described below.

Embodiment A

The exhaust gas purification device of the present invention may be applied to an internal combustion engine mounted on a vehicle and having a configuration capable of recovering the kinetic energy of the vehicle in a form of the converted electric energy (i.e., regenerating electrical power) when the vehicle is reducing its speed. This kind of engine may be configured to use the regenerated electrical power to control the temperature of the catalyst. The engine having this configuration is not specifically limited in its action (i.e., its management of the regenerated electrical power) when prohibiting the control of the temperature of the catalyst.

For example, as one example illustrating a specific configuration, the exhaust gas purification device of the present invention may allow:

the control means to have "a configuration capable of controlling the temperature of the catalyst depending on an amount of electrical power supplied to the control means", and the device may further comprise:

a "charge means" capable of supplying electrical power (i.e., means for charging electrical power) to the control means; and a "regeneration means" capable of regenerating electrical power (i.e., means for regenerating electrical power) depending on the operating condition of the engine and supplying a regenerated electrical power to at least one of the control means and the charge means, and the device may have:

a configuration "to prohibit supplying electrical power from the charge means and the regeneration means to the control means" and "to supply the regenerated electrical power to the charge means" when prohibiting the control of the temperature of the catalyst.

The above configuration allows the device to avoid using energy that does not contribute to the operation of the engine when prohibiting the control of the temperature of the catalyst, since the regenerated electrical power (i.e., the electrical power that is supposed to be used to control the temperature of the catalyst) is supplied (charged) to the charge means. Hence, the exhaust gas purification device of this embodiment can use the regenerated electrical power as efficiently as possible.

On the other hand, the "charge means" may be any means capable of being charged and discharged, and is not specifically limited. For example, as the charge means, a battery having a predetermined electrical power capacity may be employed.

The "regeneration means" may be configured to selectively supply the regenerated electrical power to at least one of the control means and the charge means or to simultaneously supply the regenerated electrical power to the both. For example, as the regeneration means, the following configurations may be employed: a configuration to regenerate electrical power by using an alternator installed on the vehicle; and a configuration where a motor installed on the vehicle (e.g., hybrid vehicles or electric vehicles) as a drive source is used as a generator to regenerate electrical power depending on the operating condition of the vehicle (for example, when executing the regeneration brake).

Embodiment B

As above, the exhaust gas purification device of the above embodiment (the embodiment A) is configured to supply the regenerated electrical power to the charge means when prohibiting the control of the temperature of the catalyst. However, in the case that the remaining battery level of the charge means is considerably high, the regenerated electrical power may not be sufficiently supplied (charged) in the charge means. The device is not specifically limited in its action in such situation.

For example, as one example illustrating a specific configuration, the exhaust gas purification device of the present invention may allow:

the supply means to have "a configuration capable of controlling the temperature of the reduction agent depending on an amount of electrical power supplied to the supply means", and the device may have:

a configuration to supply the regenerated electrical power to the supply means "when an amount of a remaining battery level of the charge means is larger than a predetermined threshold level" when prohibiting the control of the temperature of the catalyst.

The above configuration allows the device to supply the regenerated electrical power to the supply means in the case that the remaining battery level of the charge means is higher than the threshold level when prohibiting the control of the temperature of the catalyst. Thereby, for example, when the flowability of the reduction agent declined (e.g., when the engine is cold-started), the device can quickly increase the flowability of the reduction agent.

In addition, the "remaining battery level" is an index that represents a charging status (state of charge) of the charge means. In other words, being zero % in the remaining battery level represents a state where the electric energy charged in the charge means is zero, and being 100% in the remaining battery level represents a state where the electric energy charged in the charge means is the maximum amount to be charged in it.

The "threshold level" may be any such battery level that it is determined that at least part of the regenerated electrical power would not be stored (charged) in the charge means if the remaining battery level of the charge means was larger than the threshold level, and is not specifically limited.

Embodiment C

In the exhaust gas purification device of the present invention, specific embodiments of the control means are not specifically limited.

For example, as one example illustrating a specific configuration, the exhaust gas purification device of the present invention may allow:

the catalyst to be installed on an exhaust passage of the engine, and the control means to be installed at a position upstream of the catalyst on the exhaust passage and to be capable of controlling the temperature of the catalyst by changing a temperature of the exhaust gas guided to the catalyst.

The above configuration allows the device to guide exhaust gas passed through the control means to the catalyst, since the control means is installed at the position "upstream" of the catalyst. Thereby, the temperature of the catalyst can be controlled by changing the temperature of exhaust gas by using the control means.

The above are the descriptions regarding the several embodiments of the exhaust gas purification device of the invention.

DESCRIPTION OF EMBODIMENTS

Figure 1:
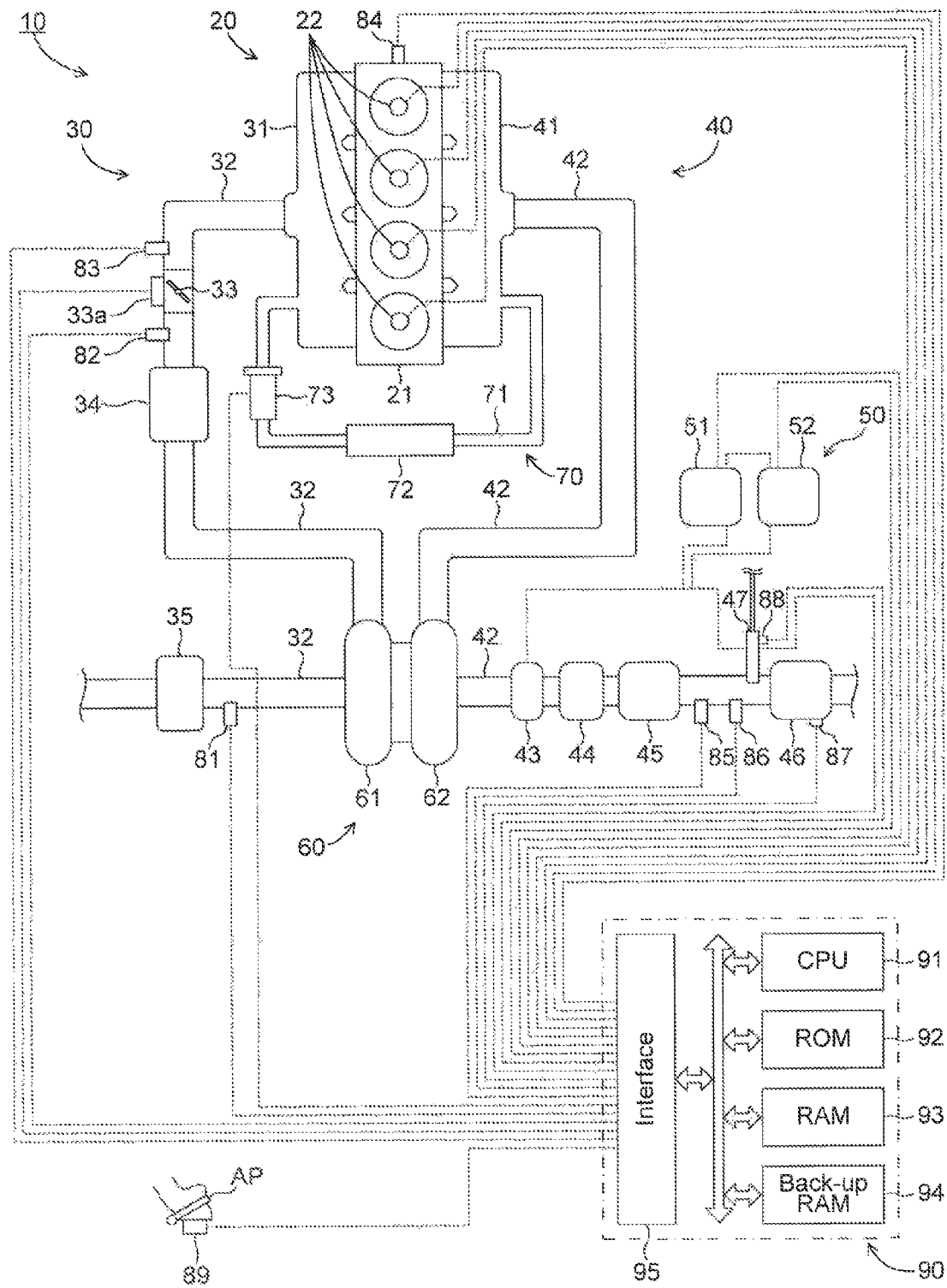
FIG. 1 is a schematic diagram of an internal combustion engine to which an exhaust gas purification device according to first embodiment of the invention is applied.

Referring to the drawings, embodiments of the exhaust gas purification device of the present invention (the first embodiment to the third embodiment) will be described below.

First Embodiment

Outline of Device

FIG. 1 illustrates a schematic configuration of a system in which the exhaust gas purification device according to the first embodiment of the present invention (hereinafter referred to as "first device") is applied to an internal combustion engine 10. The internal combustion engine 10 is a four-cycle diesel engine having four cylinders: a first cylinder, a second cylinder, a third cylinder, and a fourth cylinder. The internal combustion engine 10 is hereinafter simply referred to as "engine 10" for the sake of convenience.

As illustrated in FIG. 1, the engine 10 includes a main body 20 including a fuel injection system, an intake system 30 to guide air into the main body 20, an exhaust system 40 to discharge exhaust gas from the main body 20 to outside of the engine 10, an electrical power supply system 50 to supply electrical power to members constituting the engine 10, a supercharger 60 driven by using energy of exhaust gas to compress air guided to the main body 20, an EGR unit 70 to recirculate exhaust gas from the exhaust system 40 to the intake system 30, sensors 81-89, and an electronic control unit 90.

The main body 20 includes a cylinder head 21 through which the intake system 30 and the exhaust system 40 are connected, and a plurality of fuel injection devices 22 mounted on the cylinder head 21. Each of the fuel injection devices 22 is controlled to inject fuel into each combustion chamber depending on instruction signals from the electronic control unit 90.

The intake system 30 includes intake ports (not shown) formed on the cylinder head 21, an intake manifold 31 connected to each cylinder via the intake ports, an intake pipe 32 connected to a collecting area located upstream of the intake manifold 31, a throttle valve (intake throttling valve) 33 capable of changing the area of the opening area (the opening cross-sectional area) of the intake pipe 32, a throttle valve actuator 33a rotatory driving the throttle valve 33, an intercooler 34 installed upstream of the throttle valve 33 on the intake pipe 32, and an air cleaner 35 installed upstream of the supercharger 60 located upstream of the intercooler 34. The intake manifold 31 and the intake pipe 32 constitute an intake passage.

The exhaust system 40 includes exhaust ports (not shown) formed on the cylinder head 21, the exhaust manifold 41 connected to each cylinder via the exhaust ports, an exhaust pipe 42 connected to a collecting area located downstream of the exhaust manifold 41, an electric heater 43 installed downstream of the supercharger 60 installed on the exhaust pipe 42, an oxidative catalyst 44 installed downstream of the electric heater 43, a diesel particulate filter 45 installed downstream of the oxidative catalyst 44, a SCR catalyst 46 installed downstream of the diesel particulate filter 45, and a reduction agent injector 47 to supply a reduction agent (e.g., urea solution) into exhaust gas guided to the SCR catalyst 46 depending on instruction signals from the electronic control unit 90. The reduction agent injector 47 is connected to a reduction agent storage tank (not shown) via a pipe to deliver the reduction agent. Furthermore, the reduction agent injector 47 has an electric heater (not shown, and hereinafter referred to as "reduction agent injector heater"). The electric heater 43, the oxidative catalyst 44, the diesel particulate filter 45 and the SCR catalyst 46 constitute a set of exhaust gas purification device. The exhaust manifold 41 and the exhaust pipe 42 constitute an exhaust passage.

The electrical power supply system 50 includes a battery 51, and a regeneration unit 52 capable of regenerating electrical power in the case of a vehicle with the engine 10 reducing speed, etc. The regeneration unit 52 is connected to the battery 51, the electric heater 43 and the reduction agent injector 47, and supplies the regenerated electrical power to any one of them depending on instruction signals from the electronic control unit 90. The battery 51 is also connected to the electric heater 43 and the reduction agent injector 47, and supplies the regenerated electrical power to any one of them depending on instruction signals from the electronic control unit 90. The electrical power regenerated here is hereinafter referred to as "regenerated electrical power".

The supercharger 60 includes a compressor 61 located on the intake passage (the intake pipe 32) and a turbine 62 located on the exhaust passage (the exhaust pipe 42). The supercharger 60 is configured to compress air guided to the compressor 61 by using energy of exhaust gas guided to the turbine 62.

The EGR unit 70 includes an exhaust recirculation pipe 71 constituting a passage (EGR passage) to recirculate exhaust gas from the exhaust manifold 41 to the intake manifold 31, a unit to cool the EGR gas (EGR gas cooler) 72 installed on the exhaust recirculation pipe 71, and an EGR control valve 73 installed on the exhaust recirculation pipe 71. The EGR control valve 73 controls the amount of the recirculated gas depending on instruction signals of the electronic control unit 90.

Regarding the sensors 81-89, the first device includes an air flow meter 81, an intake temperature sensor 82, a supercharging pressure sensor 83, a crank position sensor 84, a NOx sensor 85, an exhaust temperature sensor 86, a catalyst temperature sensor 87, a reduction agent injector sensor 88 and an acceleration pedal position sensor (PM sensor) 89.

The air flow meter 81 is installed on the intake passage (the intake pipe 32). The air flow meter 81 outputs signals corresponding to the mass flow rate of intake air flowed in the intake pipe 32 (i.e., the mass of intake air to the engine 10).

The intake temperature sensor 82 is installed on the intake passage (the intake pipe 32). The intake temperature sensor 82 outputs signals corresponding to an intake temperature, which is the temperature of intake air flowed in the intake pipe 32.

The supercharging pressure sensor 83 is installed downstream of the throttle valve 33 on the intake pipe 32. The supercharging pressure sensor 83 outputs signals representing a pressure of air in the intake pipe 32 (i.e., a supercharging pressure generated by the supercharger 60).

The crank position sensor 84 is installed near the crankshaft (not shown). The crank position sensor 84 outputs signals corresponding to a rotation of the crankshaft (i.e., signals corresponding to the engine rotation speed).

The NOx sensor 85 is installed on upstream of the SCR catalyst 46. The NOx sensor 85 outputs signals corresponding to a concentration of nitrogen oxide (NOx) of exhaust gas guided to the SCR catalyst 46.

The exhaust temperature sensor 86 is installed on upstream of the SCR catalyst 46. The exhaust temperature sensor 86 outputs signals corresponding to a temperature of exhaust gas guided to the SCR catalyst 46.

The catalyst temperature sensor 87 is installed on the SCR catalyst 46. The catalyst temperature sensor 87 outputs signals corresponding to a temperature Tcat of the SCR catalyst 46.

The reduction agent injector sensor 88 is installed on the reduction agent injector 47. The reduction agent injector sensor 88 outputs signals corresponding to a temperature of the reduction agent injector 47.

The acceleration pedal position sensor 89 is installed on the acceleration pedal AP, which is controlled by an operator of the engine 10. The acceleration pedal position sensor 89 outputs signals corresponding to the position of the acceleration pedal AP.

The electronic control unit 90 includes a CPU 91, a ROM 92 storing in advance programs, tables (maps) and constant numbers used in the operation of the CPU 91, a RAM 93 in which the CPU 91 temporarily stores data as necessary, a back-up RAM 94 storing data when the power is on and keeping the stored data even while the power is off, and an interface 95 including an AD converter. The CPU 91, the ROM 92, the RAM 93, the back-up RAM 94 and the interface 95 are connected each other via buses.

The interface 95 is connected to the above sensors and transmits signals from the sensors to the CPU 91. Furthermore, the interface 95 is connected to various members such as the injector 22, the actuator 33a, the reduction agent injector 47, the battery 51, the regeneration unit 52 and the EGR control valve 63, and sends instruction signals thereto depending on the instructions from the CPU 91.

<Outline of Control>

Figure 2:
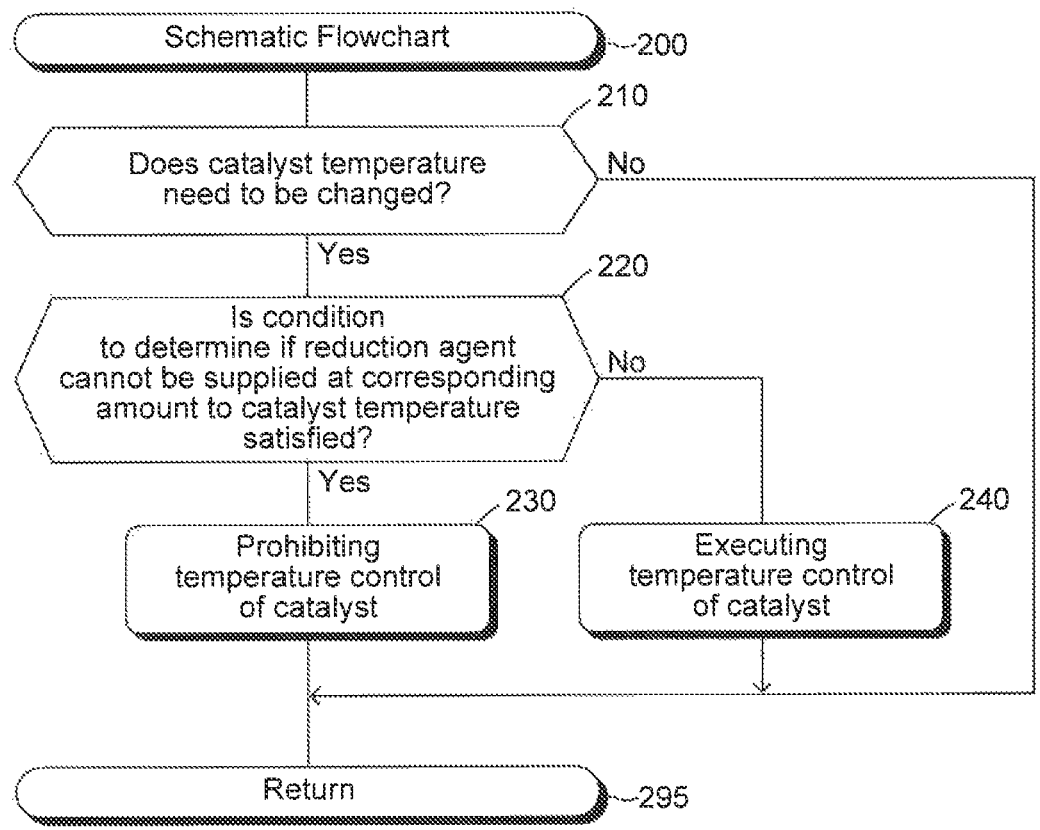
FIG. 2 is a schematic flowchart illustrating an outline of controlling on the exhaust gas purification device according to first embodiment of the invention.

The following is an outline of control of the first device applied to the engine 10 referring to FIG. 2. FIG. 2 is a "schematic flowchart" illustrating the outline of control of the first device.

The first device determines, at step 210 in FIG. 2, whether or not the temperature of the catalyst (in particular, the SCR catalyst 46) needs to be changed at this moment (e.g., whether or not the temperature Tcat of the SCR catalyst 46 is lower than a predetermined temperature). When the temperature of the catalyst needs to be changed at this moment, the first device determines as "Yes" at step 210 and then proceeds to step 220.

At step 220, the first device determines whether or not an inoperative condition is satisfied, which condition is such that the reduction agent would not be able to be supplied at the amount corresponding to the temperature of catalyst when the condition was satisfied (specific examples of this condition will be described below).

When the inoperative condition is satisfied at this moment, the first device determines as "Yes" at step 220 and then proceeds to step 230. At step 230, the first device prohibits a control of the temperature of the catalyst.

To the contrary, when the inoperative condition is not satisfied at this moment, the first device determines as "No" at step 220 and then proceeds to step 240. At step 240, the first device executes a control of the temperature of the catalyst.

In addition, when the temperature of the catalyst should not be changed at this moment, the first device determines as "No" at step 210 and then proceeds to step 295. In this case, the first device does not execute the control of the temperature of the catalyst.

The above is the descriptions regarding the first device.

Second Embodiment

Next, an embodiment, as one example of the outline of control employed in the first device being actually applied to the engine 10, will be described below. In this embodiment, the regenerated electrical power is supplied to an electrical storage means (the battery 51) in the case that the regenerated electrical power is not supplied to a temperature control means for the catalyst (the electric heater 43) due to the prohibition of the control of the temperature of the catalyst. An exhaust gas purification device of this embodiment is hereinafter referred to as "second device".

<Actual Operation>

An actual operation of the second device will be described below.

Figure 3:
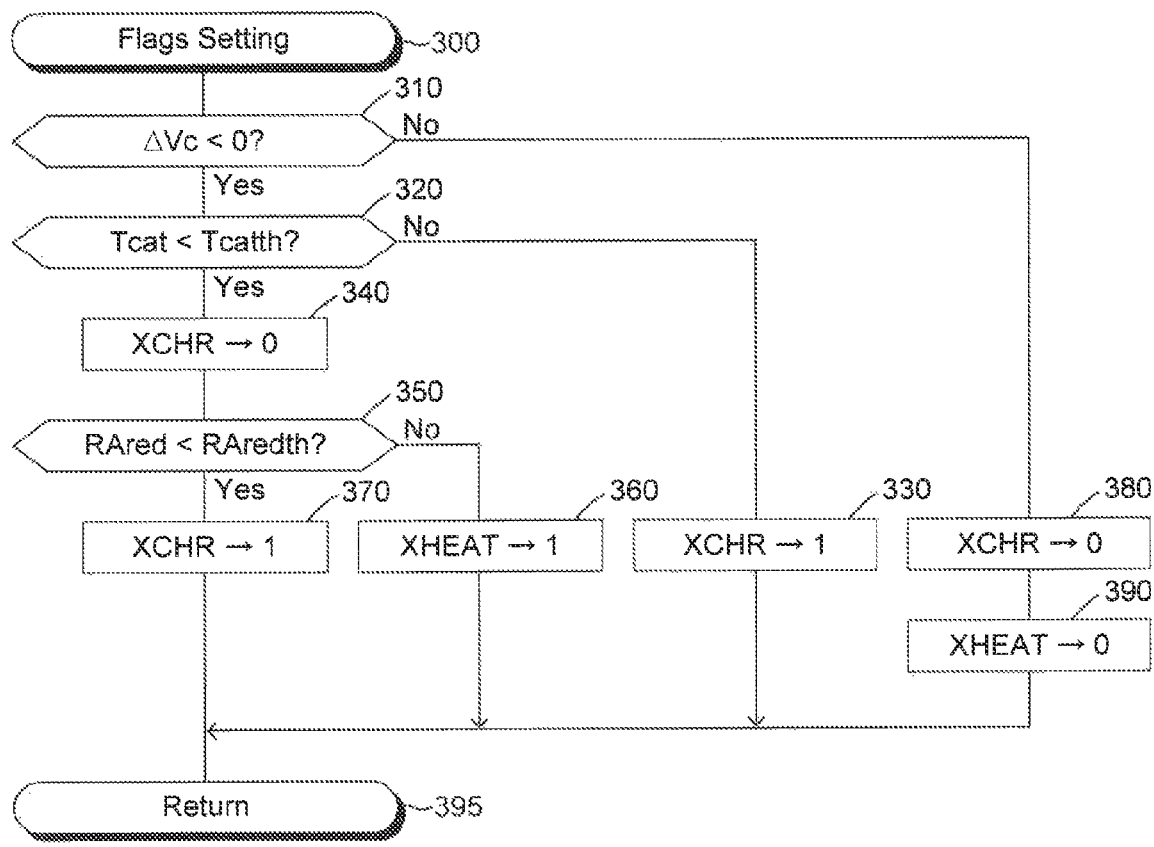
FIG. 3 is a flowchart illustrating a routine executed by a CPU of the exhaust gas purification device according to second embodiment of the invention.
Figure 4:
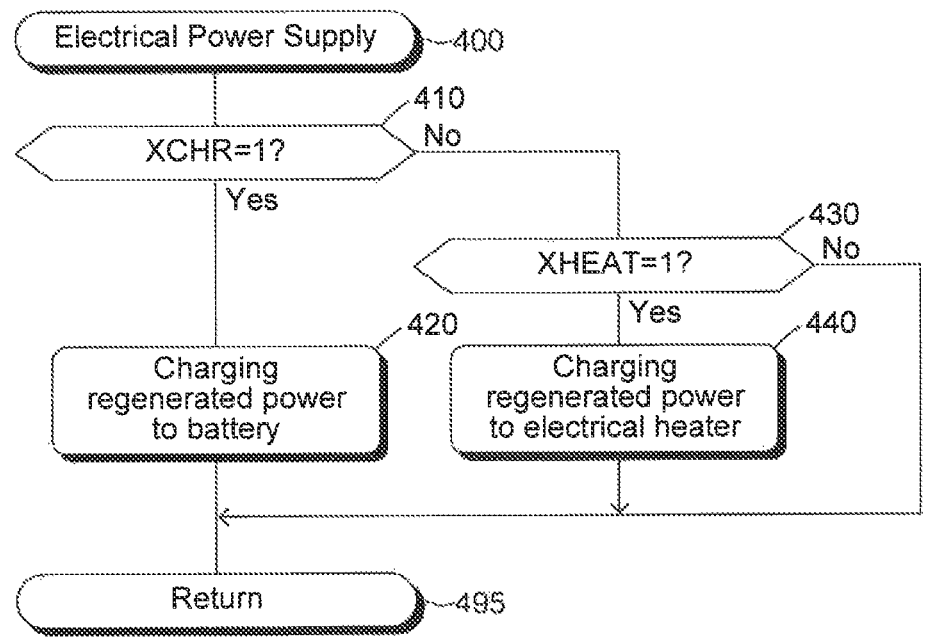
FIG. 4 is a flowchart illustrating a routine executed by a CPU of the exhaust gas purification device according to second embodiment of the invention.

In the second device, the CPU 91 repeatedly executes the routines illustrated by flowcharts in FIG. 3 and FIG. 4 at every predetermined time. The CPU 91 uses an "electric heater operation flag XHEAT" and a "charge flag XCHR" in these routines.

The electric heater operation flag XHEAT represents, when the value of the flag XHEAT is "1", that the regenerated electrical power is supplied to the electric heater 43. To the contrary, the electric heater operation flag XHEAT represents, when the value of the flag XHEAT is "0", that the regenerated electrical power is not supplied to the electric heater 43.

The charge flag XCHR represents, when the value of the flag XCHR is "1", that the regenerated electrical power is charged to the battery 51. To the contrary, the charge flag XCHR represents, when the value of the flag XCHR is "0", that the regenerated electrical power is not charged to the battery 51.

The routines executed by the CPU 91 will be described below.

First, all of values of the electric heater operation flag XHEAT and the charge flag XCHR are set at "0" at this moment.

The CPU 91 repeatedly executes the "flag setting" routines illustrated by the flowchart in FIG. 3 at every predetermined time (e.g., at every time when a crank angle of a specific cylinder matches to a specific crank angle before the intake stroke). The CPU 91 sets the values of the electric heater operation flag XHEAT and the charge flag XCHR based on operating conditions of the engine 10.

In particular, the CPU 91 starts a process at step 300 in FIG. 3 and then proceeds to step 310 at a predetermined time. The CPU 91 determines, at step 310, whether or not the change rate ΔVc of the vehicle speed Vc per unit time at this moment is a negative value (that is, whether or not the vehicle is reducing its speed and the electrical power regeneration is executed). In addition, the vehicle speed Vc may be obtained by using a speed sensor (not shown) installed on the vehicle.

When the change rate ΔVc is a negative value, the CPU 91 determines as "Yes" at step 310 to proceed to step 320. The CPU 91, at step 320, determines whether or not the temperature Tcat of the SCR catalyst 46 is lower than the predetermined threshold value Tcatth.

When the temperature Tcat of the SCR catalyst 46 is equal to or higher than the threshold value Tcatth at this moment, the CPU 91 determines as "No" at step 320 to proceed to step 330. The CPU 91, at step 330, stores the value "1" as the charge flag XCHR. After that, the CPU 91 proceeds to step 395 to end this routine once.

Furthermore, the CPU 91 repeatedly executes the "electrical power supply" routines illustrated by the flowchart in FIG. 4 at every predetermined time (e.g., at every time when a crank angle of a specific cylinder matches to a specific crank angle before the intake stroke). The CPU 91 supplies the regenerated electrical power to a target (the battery 51 or the electrical heater 43) determined depending on operating conditions of the engine 10.

In particular, the CPU 91 starts a process at step 400 in FIG. 4 and then proceeds to step 410 at a predetermined time. The CPU 91 determines, at step 410, whether or not the value of the charge flag XCHR is "1" at this moment. The value of the charge flag XCHR at this moment is actually "1", then the CPU 91 determines as "Yes" at step 410 to proceed to step 420.

At step 420, the CPU 91 instructs the regeneration unit 52 to supply the regenerated electrical power to the battery 51. After that, the CPU 91 proceeds to step 495 to end this routine once.

As above, when the temperature Tcat of the SCR catalyst 46 is equal to or higher than the threshold value Tcatth, the regenerated electrical power is supplied to the battery 51.

On the other hand, when the temperature Tcat of the SCR catalyst 46 is lower than the threshold value Tcatth at this moment, the CPU 91 determines as "Yes" at step 320 after step 310 and proceeds to step 340.

At step 340, the CPU 91 stores the value "0" as the charge flag XCHR. After that, the CPU 91 proceeds to step 350.

At step 350, the CPU 91 determines whether or not the remaining amount RAred of the reduction agent in the reduction agent storage tank is smaller than the threshold value RAredth. The threshold value RAredth may be set to "an amount of the reduction agent required to achieve a purification efficiency (a target purification efficiency) of nitrogen oxides determined based on the temperature of the SCR catalyst 46 (e.g., a target temperature determined based on the operating conditions)".

When the remaining amount RAred of the reduction agent is equal to or larger than the threshold value RAredth at this moment, the CPU 91 determines as "No" at step 350 to proceed to step 360. The CPU 91, at step 360, stores the value "1" as the electric heater operation flag XHEAT. After that, the CPU 91 proceeds to step 395 to end this routine once.

Furthermore, when the CPU 91 starts a process at step 400 in FIG. 4, the CPU 91 determines as "No" at step 410 to proceed to step 430 since the value of the charge flag XCHR at this moment is actually "0".

At step 430, the CPU 91 determines whether or not the value of the electric heater operation flag XHEAT is "1" at this moment. The value of the electric heater operation flag XHEAT at this moment is actually "1", then the CPU 91 determines as "Yes" at step 430 to proceed to step 440.

At step 440, the CPU 91 instructs the regeneration unit 52 to supply the regenerated electrical power to the electrical heater 43. After that, the CPU 91 proceeds to step 495 to end this routine once.

As above, when the temperature Tcat of the SCR catalyst 46 is lower than the threshold value Tcatth (that is, in the case that the temperature of the SCR catalyst 46 needs to be controlled) and the remaining amount RAred of the reduction agent is equal to or larger than the threshold value RAredth (that is, in the case that the reduction agent can be supplied at an amount corresponding to the temperature Tcat of the SCR catalyst 46), the regenerated electrical power is supplied to the electrical heater 43.

On the other hand, even when the temperature Tcat of the SCR catalyst 46 is lower than the threshold value Tcatth (that is, even in the case that the temperature of the SCR catalyst 46 needs to be controlled), but when the remaining amount RAred of the reduction agent is smaller than the threshold value RAredth (that is, in the case that the reduction agent cannot be supplied at an amount corresponding to the temperature Tcat of the SCR catalyst 46), the CPU 91 starts a process at step 300 in FIG. 3, passes through step 310, step 320 and step 340, and proceeds to step 350. Then, the CPU 91 determines as "Yes" at step 350 to proceed to step 370.

At step 370, the CPU 91 stores the value "1" as the charge flag XCHR. After that, the CPU 91 proceeds to step 395 to end this routine once.

Furthermore, when the CPU 91 starts a process at step 400 in FIG. 4, the CPU 91 determines as "Yes" at step 410 to proceed to step 420 since the value of the charge flag XCHR at this moment is "1".

At step 420, the CPU 91 instructs the regeneration unit 52 to supply the regenerated electrical power to the battery 51. After that, the CPU 91 proceeds to step 495 to end this routine once.

As above, when the temperature Tcat of the SCR catalyst 46 is lower than the threshold value Tcatth and the remaining amount RAred of the reduction agent is smaller than the threshold value RAredth (that is, in the case that the reduction agent cannot be supplied at an amount corresponding to the temperature Tcat of the SCR catalyst 46 even when the temperature of the SCR catalyst 46 needs to be controlled), the regenerated electrical power is supplied to the battery 51. In other words, the control of the temperature Tcat of the SCR catalyst 46 does not executed.

On the other hand, when the speed reduction is finished, the change rate ΔVc of the vehicle speed Vc becomes zero or more. When the CPU 91 starts a process at step 300 in FIG. 3 at this time, the CPU 91 determines as "No" at step 310 to proceed to step 380 and step 390.

At step 380, the CPU 91 stores the value "0" as the charge flag XCHR and after that stores the value "0" as the electric heater operation flag XHEAT. After that, the CPU 91 proceeds to step 395 to end this routine once.

Furthermore, when the CPU 91 starts a process at step 400 in FIG. 4, the CPU 91 determines as "No" at steps 410 and 430 since the charge flag XCHR and the electric heater operation flag XHEAT are actually "0" at this moment, and proceeds to step 495. Then, the CPU 91 ends this routine once.

As above, when the change rate ΔVc of the vehicle speed Vc is not a negative value, the regenerated electrical power is neither supplied to the battery 51 nor the electrical heater 43.

As is described above, the second device chooses the target to supply the regenerated electrical power (i.e., the battery 51 or the electrical heater 43) based on the temperature Tcat of the SCR catalyst 46 and the remaining amount RAred of the reduction agent.

The above is the descriptions regarding the second device.

Third Embodiment

Next, an embodiment, as another example of the outline of control employed in the first device being actually applied to the engine 10, will be described below. In this embodiment, the regenerated electrical power is supplied to a reduction agent supply means (the reduction agent injector 47 in the case that a (rate of charge) remaining battery level of the electrical storage means (the battery 51) is large. An exhaust gas purification device of his embodiment is hereinafter referred to as "third device".

<Actual Operation>

An actual operation of the third device will be described below.

Figure 5:
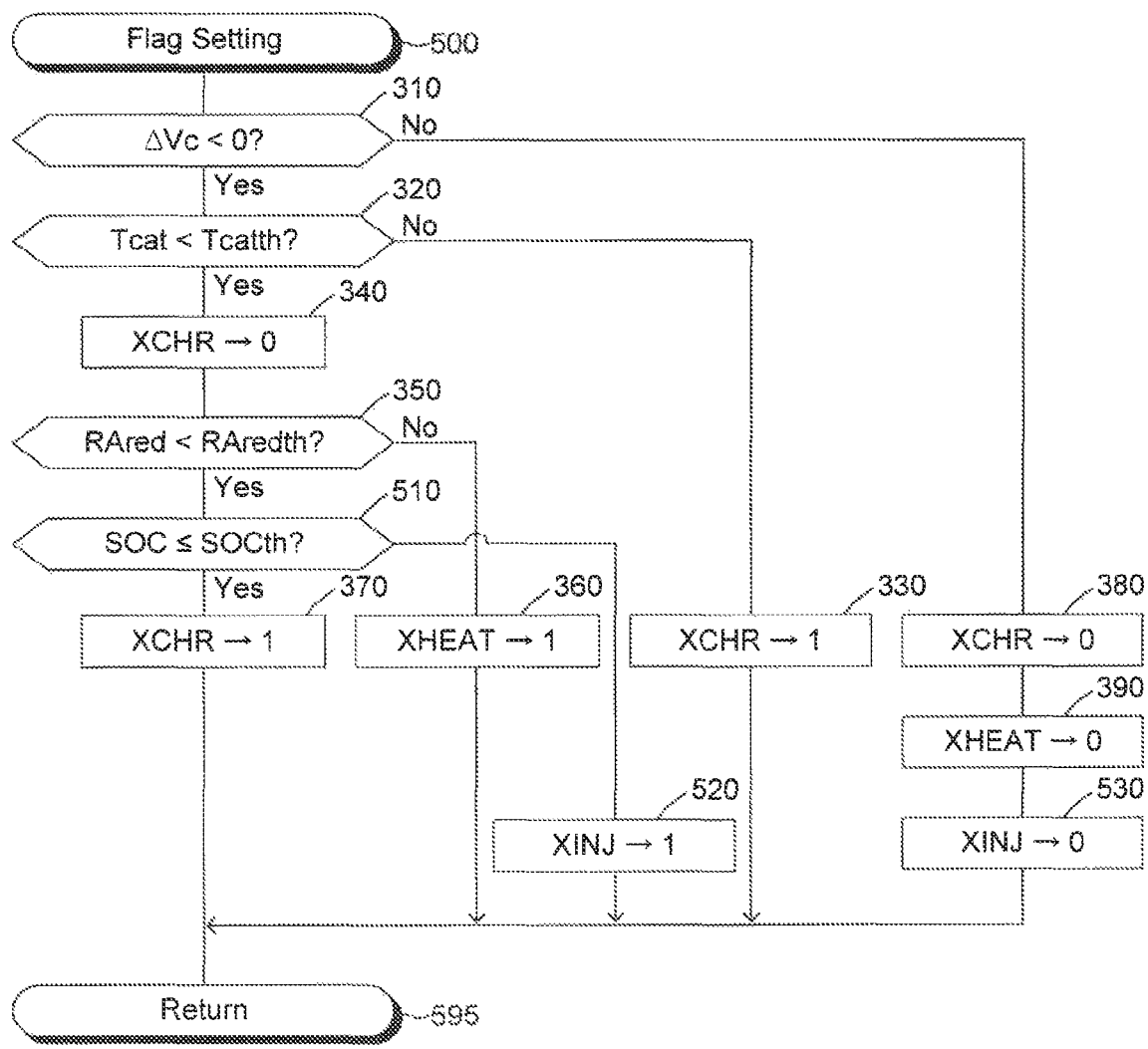
FIG. 5 is a flowchart illustrating a routine executed by a CPU of the exhaust gas purification device according to third embodiment of the invention.
Figure 6:
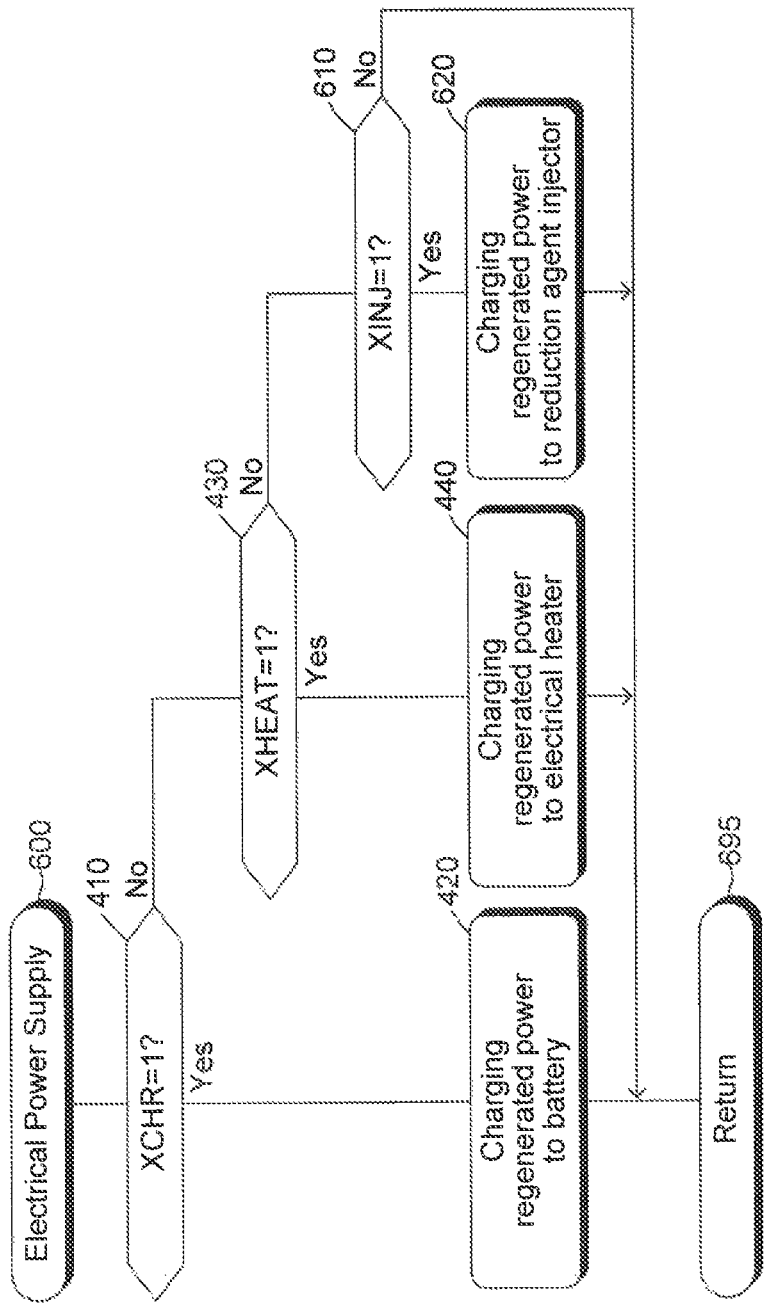
FIG. 6 is a flowchart illustrating a routine executed by a CPU of the exhaust gas purification device according to third embodiment of the invention.

The third device is different from the second device only in that the CPU 91 executes the flowcharts of FIG. 5 and FIG. 6 in place of the flowcharts of FIG. 3 and FIG. 4. Hence, the following descriptions will be mainly concerned this difference.

In the second device, the CPU 91 repeatedly executes the routines in FIG. 5 and FIG. 6 at every predetermined time as same as the second device. The CPU 91 uses the same flag as the second device (the electric heater operation flag XHEAT and the charge flag XCHR) and a "reduction agent injector heater operation flag XINJ".

The reduction agent injector heater operation flag XINJ represents, when the value of the flag XINJ is "1", that the regenerated electrical power is supplied to the reduction agent injector heater. To the contrary, the reduction agent injector heater operation flag XINJ represents, when the value of the flag XINJ is "0", that the regenerated electrical power is not supplied to the reduction agent injector heater.

The routines executed by the CPU 91 will be described below.

First, all of values of the electric heater operation flag XHEAT, the charge flag XCHR and the reduction agent injector heater operation flag XINJ are set at "0" at this moment.

The CPU 91 repeatedly executes the "flag setting" routines illustrated by the flowchart in FIG. 5 at every predetermined time (e.g., at every time when a crank angle of a specific cylinder matches to a specific crank angle before the intake stroke). The CPU 91 sets the values of the electric heater operation flag XHEAT, the charge flag XCHR and the reduction agent injector heater operation flag XINJ based on operating conditions of the engine 10.

The routine of FIG. 5 is different from the routine of FIG. 3 only in that step 510 to step 530 are added thereto. Hence, the other steps in FIG. 5 for executing the same processing as those steps in FIG. 3 are attached with the same step-numbers as those steps in FIG. 3. Detailed description is omitted regarding these steps.

When the change rate ΔVc of the vehicle speed Vc is a negative value at this moment, the CPU 91 starts a process at step 500 in FIG. 5 and then determines as "Yes" at step 310 proceeds to step 320.

When the temperature Tcat of the SCR catalyst 46 is equal to or higher than the threshold value Tcatth at this moment, the CPU 91 determines as "No" at step 320 to proceed to step 330. The CPU 91 stores the value "1" as the charge flag XCHR at step 330 and proceeds to step 395 to end this routine once. After that, the CPU 91 executes the routine of FIG. 6.

The routine of FIG. 6 is different from the routine of FIG. 4 only in that step 610 to step 620 are added thereto. Hence, the other steps in FIG. 6 for executing the same processing as those steps in FIG. 4 are attached with the same step-numbers as those steps in FIG. 4. Detailed description is omitted regarding these steps.

When the CPU 91 starts a process at step 600 in FIG. 6, the CPU 91 executes the processes in step 410 and step 420 to supply the regenerated electrical power to the battery 51, as same as the second device, since the value of the charge flag XCHR at this moment is "1".

On the other hand, when the temperature Tcat of the SCR catalyst 46 is lower than the threshold value Tcatth, the CPU 91 determines as "Yes" at step 320, passes through step 340 and proceeds to step 350. Furthermore, when the remaining amount RAred of the reduction agent is equal to or larger than the threshold value RAredth at this moment, the CPU 91 determines as "No" at step 350 to proceed to step 360. At step 360, the CPU 91 stores the value "1" as the electric heater operation flag XHEAT and proceeds to step 595 to end this routine once. After that, the CPU 91 executes the routine in FIG. 6 and thereby supplies the regenerated electrical power to the electrical heater 43 through the processes in step 410, step 430 and step 440, as same as the second device.

To the contrary, when the remaining amount RAred of the reduction agent is smaller than the threshold value RAredth at this moment, the CPU 91 determines as "Yes" at step 350 to proceed to step 510.

At step 510, the CPU 91 determines whether or not the remaining battery level SOC of the battery 51 is equal to or lower than the threshold value SOCth. When the remaining battery level SOC of the battery 51 is equal to or lower than the threshold value SOCth at this moment, the CPU 91 determines as "Yes" at step 510, proceeds to step 370 to store the value "1" as the charge flag XCHR, and then proceeds to step 595 to end this routine once. After that, the CPU 91 executes the routine in FIG. 6 and thereby supplies the regenerated electrical power to the battery 51 through the processes in step 410 and step 420, as same as the second device.

As above, when the temperature Tcat of the SCR catalyst 46 is lower than the threshold value Tcatth and the remaining amount RAred of the reduction agent is smaller than the threshold value RAredth (that is, in the case that the reduction agent cannot be supplied at an amount corresponding to the temperature Tcat of the SCR catalyst 46 even when the temperature of the SCR catalyst 46 needs to be controlled) and the remaining battery level SOC of the battery 51 is equal to or lower than the threshold value SOCth, the regenerated electrical power is supplied (charged) to the battery 51. In other words, the control of the temperature Tcat of the SCR catalyst 46 does not executed.

On the other hand, when the remaining battery level SOC of the battery 51 is higher than the threshold value SOCth, the CPU 91 determines as "No" at step 510 to proceed to step 520. At step 520, the CPU 91 stores the value "1" as the reduction agent injector heater operation flag XINJ. After that, the CPU 91 proceeds to step 595 to end this routine once.

When the CPU 91 starts a process at step 600 in FIG. 6 at this time, the CPU 91 determines as "No" at step 410 and step 430 and proceeds to step 610 since the values of the charge flag XCHR and the electric heater operation flag XHEAT are "0" at this moment.

At step 610, the CPU 91 determines whether or not the value of the reduction agent injector heater operation flag XINJ is "1". The CPU 91 determines as "Yes" at step 610 to proceed to step 620 since the value of the reduction agent injector heater operation flag XINJ is "1" at this moment.

At step 620, the CPU 91 instructs the regeneration unit 52 to supply the regenerated electrical power to the reduction agent injector heater. After that, the CPU 91 proceeds to step 695 to end this routine once.

As above, even when the temperature Tcat of the SCR catalyst 46 is lower than the threshold value Tcatth and the remaining amount RAred of the reduction agent is smaller than the threshold value RAredth (that is, even in the case that the reduction agent cannot be supplied at an amount corresponding to the temperature Tcat of the SCR catalyst 46 when the temperature of the SCR catalyst 46 needs to be controlled), if the remaining battery level SOC of the battery 51 is higher than the threshold value SOCth, then the regenerated electrical power is supplied to the reduction agent injector heater.

As is described above, the third device chooses the target to supply the regenerated electrical power (i.e., the battery 51, the electrical heater 43 or the reduction agent injector heater) based on the temperature Tcat of the SCR catalyst 46, the remaining amount RAred of the reduction agent and the remaining battery level SOC of the battery 51.

The above is the descriptions regarding the third device.

General Overview of Embodiments

As described referring to FIG. 1 to FIG. 6, the exhaust gas purification device according to the embodiments of the present invention (the first device to the third device) has:

a catalyst (SCR catalyst) 46 to purify exhaust gas by reduction of nitrogen oxide included in the exhaust gas discharged from a combustion chamber of the engine 10, which catalyst 46 has a purification efficiency of the nitrogen oxide varying depending on a temperature of the catalyst 46;

a supply means (reduction agent injector) 47 capable of supplying a reduction agent (e.g., urea solution) for the reduction of the nitrogen oxide to the exhaust gas guided to the catalyst 46; and a control means (electrical heater) 43 having a configuration capable of controlling the temperature of the catalyst 46 depending on an operating condition of the engine 10.

The exhaust gas purification device has:

a configuration to prohibit controlling the temperature Tcat of the catalyst 46 (step 230 in FIG. 2) when a condition of being incapable of supplying the reduction agent in an amount corresponding to the temperature Tcat of the catalyst 46 is satisfied (when being determines as "Yes" at step 220 in FIG. 2), even when the temperature Tcat of the catalyst 46 needs to be controlled (even when being determines as "Yes" at step 210 in FIG. 2).

The exhaust gas purification device allows:

the control means 43 (see FIG. 1) to have a configuration capable of controlling the temperature Tcat of the catalyst 46 depending on an amount of electrical power supplied to the control means 43, and the device further has:

a charge means (battery) 51 capable of supplying electrical power to the control means 43; and a regeneration means (regeneration unit) 52 capable of regenerating electrical power depending on the operating condition of the engine 10 and supplying a regenerated electrical power to at least one of the control means 43 and the charge means 51.

The exhaust gas purification device has:

a configuration to prohibit supplying electrical power from the charge means 51 and the regeneration means 52 to the control means 43 and to supply the regenerated electrical power to the charge means 51 (step 420 in FIG. 4) when prohibiting the control of the temperature Tcat of the catalyst 46 (when being determines as "Yes" at step 350 in FIG. 3).

Furthermore, the exhaust gas purification device allows:

the supply means 47 to have a configuration (reduction agent injector heater) capable of controlling the temperature of the reduction agent depending on an amount of electrical power supplied to the supply means 47, and the device has:

a configuration to supply the regenerated electrical power to the supply means 47 when an amount of a remaining battery level SOC of the charge means 51 is larger than a predetermined threshold level SOCth (when being determines as "No" at step 510 in FIG. 5) when prohibiting the control of the temperature Tcat of the catalyst 46 (when being determines as "Yes" at step 350 in FIG. 3).

In addition, the exhaust gas purification device has:

the catalyst 46 installed on an exhaust passage of the engine 10, and the control means 43 installed at a position upstream of the catalyst 46 on the exhaust passage and capable of controlling the temperature Tcat of the catalyst 46 by changing a temperature of the exhaust gas guided to the catalyst 46.

The present invention is not limited within the above specific embodiments, various modifications corrections may be made without departing from the scope of the invention.

For example, in the third embodiment, when the temperature Tcat of the SCR catalyst 46 is lower than the threshold value Tcatth and the remaining amount RAred of the reduction agent is smaller than the threshold value RAredth and the remaining battery level SOC of the battery 51 is higher than the threshold value SOCth (that is, in the case that the reduction agent cannot be supplied at an amount corresponding to the temperature Tcat of the SCR catalyst 46 and the regenerated electrical power cannot be charged to the battery 51, despite that the temperature of the SCR catalyst 46 needs to be controlled), the regenerated electrical power is supplied to the reduction agent injector heater. However, if all of the regenerated electrical power should be used in priority to avoid using the energy (the regenerated electrical power) at the electrical heater 43 without contributing an enhancement of the purification efficiency of nitrogen oxides (e.g., in view of the regeneration brake), the exhaust gas purification device of the present invention may supply the regenerated electrical power to the electrical heater 43 even in the above case (in other words, the temperature Tcat of the SCR catalyst 46 may be controlled even when a sufficient amount of reduction agent cannot be supplied thereto).

Furthermore, for example, in the case that the remaining amount RAred of the reduction agent is smaller than the threshold value RAredth, the exhaust gas purification device of the present invention may notify an operator of the engine 10 accordingly.

Additionally, in the above embodiments, the members constituting the exhaust gas purification means (exhaust gas purification system), such as the electrical heater 43 and the oxidative catalyst 44, are allocated separately on the exhaust passage (e.g., see FIG. 1). However, these members are not necessarily allocated as above and may be connected (integrated) to be installed on the exhaust passage.

The invention claimed is:

1. An exhaust gas purification device for an internal combustion engine mounted on a vehicle, the device comprising:
- a catalyst to purify exhaust gas by reduction of nitrogen oxide included in the exhaust gas discharged from a combustion chamber of the engine, the catalyst having a purification efficiency of the nitrogen oxide varying depending on a temperature of the catalyst;
- a reduction agent supply system capable of supplying a reduction agent for the reduction of the nitrogen oxide to the exhaust gas guided to the catalyst and capable of controlling the temperature of the reduction agent depending on an amount of electrical power supplied to the reduction agent supply system;
- a heater capable of controlling the temperature of the catalyst depending on an amount of electrical power supplied to the heater;
- a battery capable of supplying electrical power to the heater; and
- a regeneration unit capable of regenerating electrical power depending on an operating condition of the vehicle and capable of supplying a regenerated electrical power to at least one of the reduction agent supply system, the heater and the battery;
- a memory which stores a set of computer-readable instructions; and
- a processor for receiving the set of computer-readable instructions, wherein the processor executes the set of instructions to:
  - prohibit controlling the temperature of the catalyst by a prohibition of supplying electrical power from the battery and the regeneration unit to the heater when an amount of the reduction agent corresponding to the temperature of the catalyst cannot be supplied, even when the temperature of the catalyst needs to be controlled; and
  - supply the regenerated electrical power to the reduction agent supply system when an amount of a remaining battery level of the battery is larger than a predetermined threshold level, or supply the regenerated electrical power to the battery when the amount of the remaining battery level of the battery is equal to or smaller than the predetermined threshold level, when the amount of the reduction agent corresponding to the temperature of the catalyst cannot be supplied.

2. The exhaust gas purification device according to claim 1, the catalyst being installed on an exhaust passage of the engine, the heater being installed at a position upstream of the catalyst on the exhaust passage and being capable of controlling the temperature of the catalyst by changing a temperature of the exhaust gas guided to the catalyst.

* * * * *